United States Patent [19]

Nakamoto et al.

[11] 3,883,443

[45] May 13, 1975

[54] CATALYST ASSEMBLY FOR REMOVING NOXIOUS GASES FROM AUTOMOBILE EXHAUST

[75] Inventors: Teruyuki Nakamoto; Yoshioki Shingo, both of Tokyo; Tetsuo Yamaguchi, Yokohama; Yukio Endo, Tokyo, all of Japan

[73] Assignee: Fujikura Densen Kabushiki Kaisha, Japan

[22] Filed: Apr. 16, 1973

[21] Appl. No.: 351,761

[30] Foreign Application Priority Data

Apr. 21, 1972 Japan.............................. 47-40176

[52] U.S. Cl. ................ 252/447; 252/469; 252/470; 252/471; 252/474; 252/477 R; 423/213.5
[51] Int. Cl............................................. B01j 11/22
[58] Field of Search........ 252/474, 477 R, 469, 470, 252/471, 447; 423/213.5

[56] References Cited

UNITED STATES PATENTS

| | | | |
|---|---|---|---|
| 3,295,919 | 1/1967 | Henderson et al............... | 423/213.5 |
| 3,410,651 | 11/1968 | Brandenburg et al. .......... | 423/213.2 |
| 3,528,783 | 9/1970 | Haselden........................ | 252/477 R |
| 3,718,733 | 2/1973 | Gehri.............................. | 423/213.2 |
| 3,773,894 | 11/1973 | Bernstein et al................ | 252/474 X |

*Primary Examiner*—Winston A. Douglas
*Assistant Examiner*—W. J. Shine
*Attorney, Agent, or Firm*—McGlew and Tuttle

[57] ABSTRACT

A catalyst assembly for removing noxious gases from the automobile exhaust comprising a plurality of highly gas permeable catalyst layers each thereof composed of a copper-nickel catalyst, and a plurality of highly gas permeable separating layers each thereof composed of a ferrous material, whereby said plurality of catalyst layers are supported and isolated from each other by said plurality of separating layers.

12 Claims, 1 Drawing Figure

CATALYST ASSEMBLY FOR REMOVING NOXIOUS GASES FROM AUTOMOBILE EXHAUST

BACKGROUND OF THE INVENTION

The present invention relates to a catalyst assembly for removing noxious gases from the automobile exhaust which is capable of reducing oxides of nitrogen ($NO_x$) contained in the automobile exhaust gas to a harmless nitrogen and which has improved mechanical and chemical strength, improved durability, greater gas permeability and reduced pressure loss.

Recently, various research works have been conducted on catalysts for removing noxious gases from the automobile exhaust.

In fact, however, no practically effective catalyst which is capable of making oxides of nitrogen (hereinafter referred to as $NO_x$) into a harmless nitrogen ($N_2$) by reduction has not been available as yet.

In other words, while various catalysts have been proposed as being capable of reducing $NO_x$ contained in the exhaust gas to $N_2$, even if it is admitted that these catalysts actually exhibit an improved catalytic action, none of these catalysts has been capable of being put in practical use because, when they were installed in the afterburner in the exhaust system and used in the driving conditions of the automobile, they tended to be scattered, melt down, adhere by heat, fall off or cause the blow-by.

The present invention has been made to eliminate these deficiencies, and it is therefore the principal object of the present invention to provide a practically very useful catalyst assembly for removing noxious gases from the automobile exhaust which is capable of reducing $NO_x$ contained in the automobile exhaust gas to $N_2$ at an extremely high efficiency and which is highly durable to maintain such a high efficiency performance over a long period of time.

DESCRIPTION OF THE PREFERRED EMBODIMENT

Figure 1:
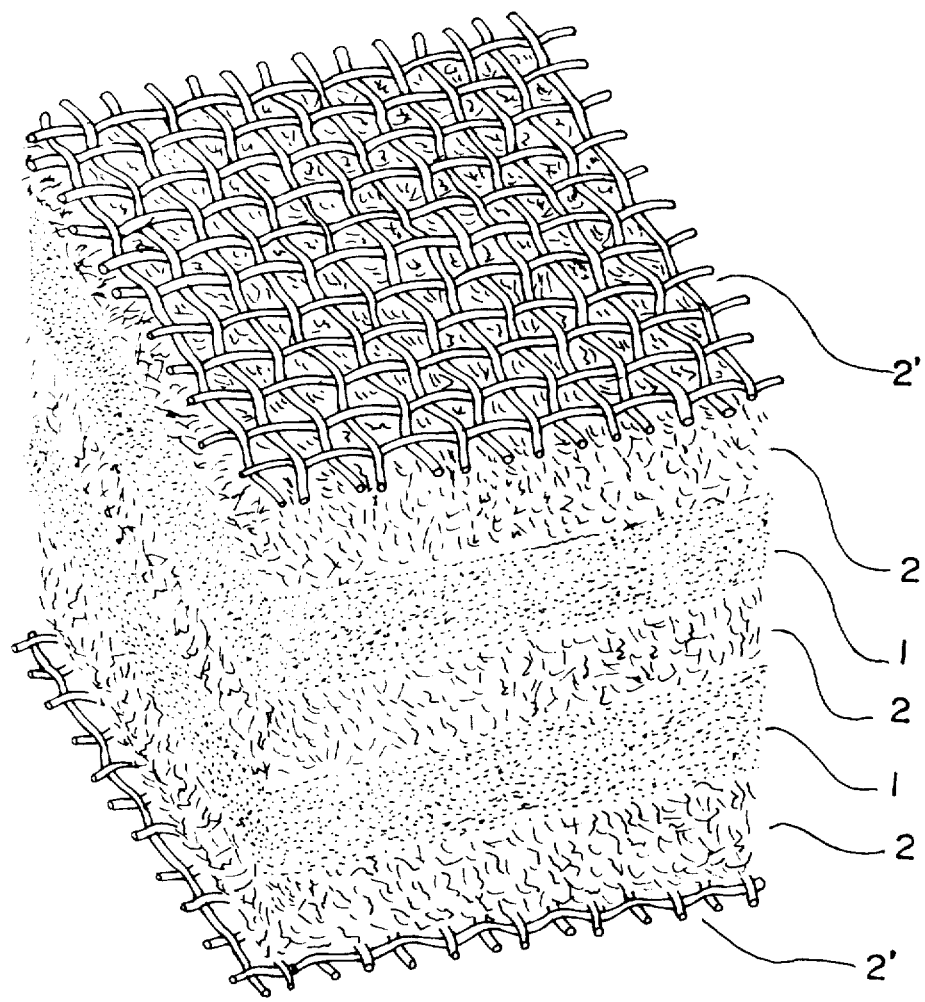
FIG. 1 is an explanatory view showing the construction of a catalyst assembly, in which numeral 1 designates layers of catalyst consisting of copper-nickel catalyst, numeral 2 designates separating layers of a ferrous material, and numeral 2' designates supports provided to support the catalyst assemly of the present invention.

The present invention thus comprises an improved catalyst assembly comprising a plurality of highly gas permeable catalyst layers consisting of copper-nickel catalyst and a plurality of highly gas permeable separating layers consisting of a ferrous material, whereby the plurality of catalyst layers are supported by the plurality of separating layers in such a manner that the catalyst layers are isolated from each other.

The copper-nickel catalyst used in this invention may include copper-nickel alloys and their composite bodies with graphite and the copper-nickel alloys may be in the previously alloyed form or may take the form of a nickel-plated copper which may eventually be converted into a copper-nickel alloy at any working temperature.

The material may also take the form of whiskers or hornlike crystals of metal which are formed by the segregation reaction or hydrogen reduction reaction of the halides of copper and nickel or the composite body of such material with graphite resulting from the segregation or hydrogen reduction reaction.

The alloy or its composite body with graphite may be used in the form of granules, fibers or webs or in the form in which the alloy itself is formed into wires, pipes, flat rolled products, chips, pellets or powder metallurgically sintered form.

A better understanding of the present invention may be had from the following detailed description when read in connection with the accompanying drawings, in which:

FIG. 1 is an explanatory view showing the construction of a catalyst assembly for removing noxious gases from the automobile exhaust according to the present invention.

The present invention will now be described in greater detail with reference to FIG. 1 illustrating the construction of a catalyst assembly according to the present invention. In FIG. 1, numeral 1 designates highly gas permeable layers of catalyst consisting of copper-nickel catalyst, numeral 2 designates highly gas permeable separating layers consisting of a ferrous material and numeral 2' designates highly heat-resisting, mechanically strong and highly permeable supports provided to support the catalyst assembly of the present invention.

The copper-nickel catalyst layer is provided in the form of fibers (including net and screen), wools, pellets, cylindrical material, sheets or whiskers of metal, and it may be produced in the manner which will be described hereunder.

In other words, the copper-nickel alloy (including Monel metal) may be passed through a drawing die to produce wires or fibers of metal, formed into pipes by the process of extrusion, or rolled into sheets. Alternately, chips or pellets may be produced from these wires, pipes or sheets, or powdered copper and nickel may be mixed and sintered by a powder metallurgical technique. In other method, a mixture of oxides, carbonates or hydroxides of copper and nickel and a halide is heated in a non-oxidizing atmosphere in the presence of carbon or in the presence of hydrogen or carbon monoxide or in the presence of carbon monoxide (or hydrogen) and halogen gas. The effectiveness of the catalyst thus obtained is not affected in the presence of carbonaceous substances.

The above-described copper-nickel catalyst according to the present invention can reduce $NO_x$ contained in the exhaust gas to $N_2$ by means of the co-existing reducing gases such as CO gas and $H_2$ gas in accordance with the following reaction formulae:

$2NO + 2CO \rightarrow N_2 + 2CO_2$
$2NO + 2H_2 \rightarrow N_2 + 2H_2O$

The percentage of purification of $NO_x$ according to the above formulae reaches as high as 90% at a temperature on the order of 650°C.

According to the present invention, the copper-nickel catalyst assembly is prepared so that it has a dimension that suits the size of the reactor mounted in the exhaust system, e.g., it has a dimension of about 20 cm (long) × 10 cm (broad) × 1 cm (thick).

It is to be noted that the thickness of the catalyst layer should preferably be minimized, since it can be made more resistant to the thermal and mechanical impacts as it is made thinner by the action of the separating layers 2 which will be explained later and moreover the space factor can also be improved. In this case, even if the catalyst layer is made excessively thin so that it is mingled with the separating layer 2, there occurs no such inconvenience as a reduced catalytic ability.

According to the present invention, the plurality of the above-described copper-nickel catalyst layers 1 are supported and separated from each other by the plurality of highly gas permeable separating layers 2 consisting of a ferrous material. The separating layer 2 consisting of a ferrous material comprises a web, felt, wool, net, screen or apertured foil composed of an iron, steel or alloy steel containing the addition of such transition elements as nickel (Ni), chromium (Cr), cobalt (Co), manganese (Mn), titanium (Ti), zirconium (Zr) and vanadium (V), and it has a very large surface area of greater than $1 \times 10^4 cm^2/kg$ and an excellent gas permeability.

The separating layer 2 may be prepared by way of example in the following manner.

While the material for the separating layer 2 may be prepared by various processes, such as, the die drawing, cutting, scratching, etching or the processing of rolled foil material, the drawing process is the most preferred one and in this case the separating layer 2 takes the form of a web composed of stainless steel fibers finished to a diameter of 12 to 50 $\mu\phi$.

The stainless steel used may comprise any of AISI type Nos. 430, 304, 316, 310S and so on.

While the action of the separating layers 2 composed of the ferrous material described above has not been made clear completely, one effect of the separating layers 2 appears to reside in the fact that these layers prevent the copper-nickel catalyst layers from being scattered owing to the flow or impact of the exhaust gas or being melted or adhered to one another to form a block by the heat of the exhaust gas and that also these layers mechanically support the initial condition of the catalyst layers 1 and permit a satisfactory contact between the copper-nickel catalyst constituting the catalyst layers 1 and the exhaust gas. Another effect attributable to the separating layers 2 is that the ferrous material constituting the separating layers is believed to act as a catalyst in the reaction in which the co-existing gases HC, $H_2O$, $CO_2$ and $O_2$ in the exhaust gas react with one another to produce reducing gases (CO, $H_2$). Though the reaction mechanism is also not clearly known, it may possibly be explained in this way that the reducing gases are produced by the decomposition of steam and the cracking of HC and these gases reduce $NO_x$ in accordance with the previously mentioned reactions.

The catalyst assembly according to the present invention may be further enclosed with supports 2' composed of a ferrous material to retain the mechanical structure of the assembly. The manner in which the copper-nickel catalyst layers are isolated from each other by the separating layers composed of the ferrous material as well as the manner in which the catalyst assembly is supported by the supporting memebers will be made apparent by examples which will be described later.

Since the catalyst assembly according to the present invention comprises the copper-nickel catalyst layers which are capable of purifying $NO_x$ at a high efficiency and highly gas permeable and the separating layers composed of the ferrous material which act as a catalyst in the reaction that produces CO and $H_2$ which are effective in the reduction of $NO_x$ to $N_2$, it ensures a high percentage of purification and the pressure loss is also very small.

Further, since the copper-nickel catalyst layers are isolated from each other by the ferrous separating layers which which are highly durable chemically, thermally and mechanically, there is no danger of the copper-nickel catalysts being caused to scatter by the gas flow or melt down or fused to form a block by the heat of the exhaust gas, and thus the catalyst layers can retain their excellent performance over a long period of time.

There is a further remarkable effect in that while conventional copper-nickel catalysts generally tend to exhibit a reduced purifying efficiency and a sharp increase in the pressure loss when they are used with a fuel gasoline containing the addition of lead compound, it has been found that the catalyst assembly constructed according to the present invention retains its excellent initial catalytic action (percentage of purification) without any deterioration even when it is used with gasoline containing the addition of lead compound and its durability is also very high.

These remarkable effects attributable to the catalyst assembly according to the present invention will become readily apparent from the following examples.

The present invention is not intended to be limited to the following examples.

EXAMPLE 1

A nickel-plated copper wire of about 10 m length and 0.8 mm$\phi$ in diameter was folded in a zigzag form at intervals of 20 cm with a space of 2 mm therebetween, and the resultant flat square screens of 20 cm $\times$ 10 cm dimension were alternately put one over another with 60-mesh wire nets of AISI type No. 304 stainless steel having a dimension of 20 cm $\times$ 10 cm. Thereafter, a stainless steel wire net of the same kind was placed on each surface of the laminate to form a wire net lamination and then this wire net lamination was bound with a stainless steel wire of 0.8 mm in diameter, thereby forming a subassembly of 10 mm thick.

The subassemblies thus prepared were then placed in a non-oxidizing furnace where they were subjected to a heat treatment for 60 minutes at a temperature of 800°C while leading CO into the furnace, and thereafter the subassemblies were removed from the furnace. The five heat-treated subassemblies were piled one over another and placed in the reactor installed in the exhaust pipe of an internal combustion engine. The exhaust gas was then passed through the catalyst assembly.

At the internal temperature of 800°C in the reactor, $NO_x$ in the exhaust gas was removed at an excellent reduction rate of 80% and the percentage of removal of $NO_x$ was still as high as 70% after 100 hours of test.

In the case of a catalyst having no separating layers of stainless steel wire net, the initial percentage of removal of $NO_x$ was 80%, but it dropped to 30% after 100 hours of test.

Since the catalyst assembly according to this example comprises only the metal wires and the metal nets, there is an advantage that the assembly can be manufactured with extreme ease and at a low cost.

EXAMPLE 2

A wire of 400 Monel metal (Ni 70%, Cu 28%, Fe

2–3% and others) having a diameter of 0.5 mm was cut in lengths of 2–3 mm each and the chips thus obtained were subjected to a heat treatment for 30 minutes at a temperature of 900°C in a non-oxidizing furnace while leading a small quantity of CO into the furnace. After cooling, 200 g of the treated chips were uniformly spread over a 100 cm × 20 cm web of AISI type No. 304 stainless steel having a dimater of 12 microns and a weight of 8 ounces per square yard and then another stainless steel web of the same size was placed on top of the spread chips. The peripheral portions and internal portions of the webs were sewn with a fine stainless wire with suitable stitches so that the enclosed chips would not escape to the outside or they would not be distributed unevenly. A 12-mesh stainless steel wire net of 10 cm × 20 cm was applied onto each of the upper and lower surfaces of the resultant mat to form a lamination as a whole and this lamination was then bound with a stainless steel wire, thus producing a subassembly.

Five of this subassembly were placed one over another and installed in the reactor and then the exhaust gas was passed through them in the vertical direction. In this example, NO in the exhaust gas removed at a high percentage of over 90% at the reactor temperature of 650°C and moreover this catalyst assembly showed a removal rate of 93% even after 100 hours of test.

On the other hand, a catalyst employing no web separating layers showed the initial removal rate of 90%, but this rate dropped to 35% after 100 hours of test.

EXAMPLE 3

40-mesh metal wire nets of an alloy containing Ni 40% and Cu 60% and 60-mesh metal wire nets of AISI type No. 304 stainless steel were cut into pieces each having a dimension of 10 cm × 20 cm and were then placed alternately one over another. The resultant laminations were bound into subassemblies each having a thickness of 10 mm.

The subassemblies thus formed were placed in a non-oxidizing furnace where they were subjected to a heat treatment for 120 minutes at a temperature of 500°C while leading CO into the furnace.

Five of the treated and cooled subassemblies were placed one over another and then installed in the exhaust gas reactor, and the exhaust gas was passed through them in the vertical direction.

In this example, the percentage of removal of NO in the exhaust gas was as high as 80% at the reaction temperature of 800°C. After 100 hours of test, the percentage was 90%. With a catalyst employing no separating layers of stainless steel wire net, the initial percentage of removal of NO was 80%, but it dropped to 15% after 100 hours of test. Since the catalyst assembly of this example was made of the metal wire nets, it has an advantage of being easy and inexpensive to manufacture.

EXAMPLE 4

40-mesh metal wire nets of 400 Monel metal of 10 cm × 20 cm and webs of AISI type No. 316L stainless steel of 10 cm × 20 cm having a diameter of 25 microns and a weight of 3 ounces per square yard were laminated alternately one over another producing a lamination of 10 mm thick. A 12-mesh metal wire net of AISI type No. 304 stainless steel having a dimension of 10 cm × 20 cm was placed on each of the upper and lower surfaces of the lamination and the whole structure was then bound with a fine stainless steel wire thus producing a subassembly. The subassemblies prepared in this manner were then placed in a non-oxidizing furnace where they were subjected to a heat treatment for 30 minutes at a temperature of 950°C while leading CO into the furnace.

Five of the treated and cooled subassemblies were placed one over another, installed in the exhaust gas reactor and then the exhaust gas was passed through them in the vertical direction.

In this example, the percentage of removal of NO in the exhaust gas was 90% at the reactor temperature of 750°C. After 100 hours of test, the percentage of removal was 85%. On the other hand, a catalyst employing no separating layers of stainless steel wire net showed the percentage of removal of NO which was 90% initially but dropped to 30% after 100 hours of test. Since the catalyst assembly of this example was made of the metal wire nets as was the case with that of the Example 3, it has an advantage of being simple and inexpensive to manufacture.

EXAMPLE 5

A sheet 0.1 mm thick of an alloy containing Ni 60% and Cu 40% (or 400 Monel metal containing Ni 70% and Cu 28%) was uniformly formed with holes having a small diameter (3 mm$\phi$) and it was then formed into a uniformly corrugated sheet with the depth of the furrows being determined in accordance with the diameter of the holes. This corrugated sheet was cut into pieces each having a dimension of 10 cm × 20 cm and the pieces thus cut were alternately put one over another with webs of AISI type NO. 304 stainless steel of the same size having a weight of 3 ounces per square yard and a diameter of 12 microns. Then, a 40-mesh stainless steel wire net of the same size was placed on each of the upper and lower surface of the resultant structure to form a subassembly of 10 mm thick.

The subassemblies thus formed were then heated up to 600°C and subjected to an aging treatment for an hour in a reducing atmosphere containing carbon monoxide and hydrogen. Five of the thus treated subassemblies were placed one over another, installed in the reactor and then the exhaust gas was passed through them in the vertical direction. In this example, the percentage of removal of NO in the exhaust gas was 90% at the reactor temperature of 720°C.

After 100 hours of test, the percentage shown was 80%. On the other hand, the initial percentage of removal for a catalyst having no stainless steel web separating layers was 90%, but it dropped to 35% after 100 hours of test.

EXAMPLE 6

Copper powder and nickel powder for powder metallurgy were mixed at the ratio of 1:1 and the mixture was subjected to the process of pressing and heating in accordance with a known powder metallurgical technique, thereby producing 100 g of cylindrical copper-nickel pellets having a diameter of 3 mm$\phi$ and a length of 5 mm. On the other hand, a 40-mesh stainless steel wire net of 10 cm × 20 cm was corrugated by folding it to form parallel grooves and ridges at intervals of about 5.3 mm and this corrugated wire net was used as a substrate so that the pellets were uniformly arranged on the grooves of the wavy surface. A 100-mesh stainless steel wire net of 10 cm × 20 cm and a 40-mesh stainless steel wire net of 10 cm × 20 cm were placed over the corrugated sheet having the pellets disposed thereon and two of the resultant structure were put together in such a manner that the corrugated surfaces of the two structures fit to each other, thus producing a unitary plate structure of about 6 mm thick. This structure was then bound with a stainless wire producing a subassembly.

The subassemblies prepared in this way were heated up to 700°C and subjected to an aging treatment for an hour in a reducing atmosphere containing CO and $H_2$. Five of the thus treated subassembly were placed one over another and installed in the reactor and then the exhaust gas was passed through them in the vertical direction.

In this example, the percentage of removal of NO in the exhaust gas was 80% at the reactor temperature of 750°C. After 100 hours of test, the percentage was 75%.

EXAMPLE 7

100 g of copper, 10 g of $NiCl_2 6H_2O$ and 10 g of graphite powder passing through 200-mesh were thoroughly mixed together and the mixture was placed with a uniform thickness in a covered container of AISI type No. 304 stainless steel having a bottom face of 15 cm × 15 cm and a depth of 20 cm. The container was then placed in a non-oxidizing furnace where it was heated for 60 minutes at a temperature of 750°C to grow fibrous metal whiskers of copper and nickel. The whiskers thus obtained were disentangled into fine pieces and 10 g of the whiskers was uniformly spread over a web of AISI type No. 304 stainless steel having a dimension of 10 cm × 20 cm, a diameter of 25 microns and a weight of 8 ounces per square yard and on top of this was placed a stainless steel web of the same size. The peripheral portions and the internal portions of the resultant structure was sewn lengthwise and crosswise with a fine stainless steel wire so that the enclosed fibrous metals would not escape to the outside or would not be moved and distributed unevenly. A 24-mesh stainless steel wire net of 10 cm × 20 cm was placed on each of the upper and lower surfaces of the resultant mat to form a lamination as a whole and then this lamination was bound with a stainless steel wire to form a subassembly.

The subassembly was then heated up to a temperature of 600°C and then subjected to an aging treatment for 30 minutes in a reducing atmosphere containing CO and $H_2$.

Five of the thus treated subassemblies were placed one over another, installed in the reactor and the exhaust gas was then passed through them in the vertical direction. In this example, the percentage of removal of NO in the exhaust gas was 90% at the reactor temperature of 65020C. This high efficiency of the catalyst assembly did not deteriorate even after 100 hours of a long test period and the percentage of as high as 90% was maintained.

While the intial percentage of removal of NO for a catalyst employing no separating layers of stainless steel web was 70%, this percentage dropped to 10% after 100 hours of test.

EXMAPLE 8

50 g of NiO, 30 g of $NiCl_2 6H_2O$, 50 g of CuO, 20 g of CuCl, and 70 g of graphite passing through 20-10 mesh were thoroughly mixed and spread in uniform thickness of 10 mm and then put in a covered stainless steel container. Then the mixture was subjected to a heat treatment for 60 minutes at 950°C in a non-oxidizing atmosphere furnace to obtain a copper-nickel-graphite composite body.

5 g of this composite body was uniformly spread over a web of AISI type No. 304 stainless steel having a dimension of 10 cm × 20 cm, a diameter of 12 microns and a weight of 3 ounces per square yard and four layers of the resultant material were placed one over another. On top of this structure was placed a stainless steel web of the same size and in the same manner as the previously mentioned serveral examples the peripheral portions and the internal portions were sewn with a fine stainless steel wire to prevent the enclosed metals-graphite composite body from escaping to the outside or migrating. On each of the upper and lower surfaces of the resultant mat was placed a 24-mesh stainless steel wire net of 10 cm × 20 cm, thereby forming a lamination as a whole.

Five of this lamination were placed one over another, installed in the reactor and then the exhaust gas was passed through them in the vertical direction.

In this example, the percentage of removal of NO in the exhaust gas was 90% at the reactor temperature of 650°C.

Moreover, this high percentage was maintained at 90% even during a long test period of 100 hours.

On the other hand, for a catalyst employing no separating layers of stainless steel web the intitial percentage of removal of NO was 90%, but it dropped to 15% after 100 hours of test.

EXAMPLE 9

A 10-mesh copper wire net was cut into pieces each having a dimension of 10 cm × 20 cm. On the other hand, a mixture raw material containing 100 parts by weight of NiO and 50 parts by weight of Cu was prepared and then spread uniformly at a ratio of 30 g to 500 g of the copper metal wire net. The resultant material was then placed in a covered container of stainless steel and it was heated for 60 minutes at 750°C in a non-oxidizing atmosphere while leading a small quantity of CO into the atmosphere thus precipitating metallic nickel-copper on the metal wire net. The metal wire nets prepared in this way were alternately placed one over another with webs of AISI type No. 304 stainless steel having a dimension of 10 cm × 20 cm, a diameter of 25 microns and a weight of 3 ounces per square yard, forming a lamination of 10 mm thick. A 12-mesh stainless steel wire net of the same size was placed on each of the upper and lower surfaces of the lamination and put together, thereby producing a subassembly.

Five of this subassembly were placed one over another, installed in the reactor and then the exhaust gas was passed through them in the vertical direction.

In this example, the percentage of removal of NO In the exhaust gas was 90% at the reactor temperature of 750°C. After 100 hours of test, the percentage was 80%. On the other hand, while the initial percentage of removal for a catalyst employing no separating layers of stainless web was 90%, it dropped to 20% after 100 of test.

The advantages of the catalyst assembly of this example are an excellent percentage of removal of NO and comparative easiness and inexpensiveness of manufacture.

What we claim is:

1. A catalyst assembly for removing noxious gases from the automobile exhaust comprising a plurality of highly gas permeable catalyst layers each thereof composed of a copper-nickel catalyst, and a plurality of highly gas permeable separating layers each thereof composed of a ferrous material, said plurality of catalyst layers being supported and isolated from each other by said plurality of separating layers.

2. A catalyst assembly according to claim 1 wherein said copper-nickel catalyst consists of any copper-nickel alloy or a composite body consisting of said copper-nickel alloy and graphite.

3. A catalyst assembly according to claim 1 wherein said copper-nickel catalyst consists of a nickel-plated copper which is converted into a copper-nickel alloy at any working temperature.

4. A catalyst assembly according to claim 1 wherein said copper-nickel catalyst consists of whiskers or hornlike crystals of copper and nickel produced by the segregation reaction or hydrogen reduction reaction employing halides of copper and nickel as source materials or a composite body consisting of said whiskers or hornlike crystals and graphite.

5. A catalyst assembly according to claim 1 wherein said copper-nickel catalyst is in the form of granules, fibers or of a web form.

6. A catalyst assembly according to claim 1 wherein said copper-nickel catalyst is in the form of wools, pipes, rolled sheets, pellets or powder metallurgically sintered powders.

7. A catalyst assembly according to claim 1 wherein said separating layer consists of a web, felt, wool net, screen or apertured foil made of iron, steel or alloy steel containing additions of any transition elements including nickel, chromium, cobalt, manganese, titanium, zirconium, vanadium.

8. A catalyst assembly according to claim 1 wherein said separating layer is made of a ferrous material and has a surface area greater than $1 \times 10^4$ cm²/kg.

9. A catalyst assembly according to claim 1 wherein said separating layer consists of a web composed of stainless steel fibers having a diameter between 12 and 50 $\mu$ 10. A catalyst assembly according to claim 1 wherein said ferrous material is any one of American Iron and Steel Institute stainless steel Nos. 430, 304, 316 and 310S.

11. A catalyst assembly for removing noxious gases from the automobile exhaust comprising a plurality of highly gas permeable catalyst layers each thereof consisting of a copper-nickel catalyst, a plurality of highly gas permeable separating layers each thereof consisting of a ferrous material, and a plurality of highly heat resisting, mechanically strong and permeable supporting members, whereby said plurality of catalyst layers supported and isolated from each other by said plurality of separating layers are enclosed by said plurality of supporting members.

12. A catalyst pack for removing noxious gases from the automobile exhaust, comprising an assembly of a plurality of highly gas-permeable catalyst layers each being composed of a copper-nickel catalyst and a plurality of highly gas-permeable separating layers each composed of a ferrous material and supporting and isolating said catalyst layers from each other, and a plurality of enclosing supporting members engaged over each end of said separating layers.

* * * * *